US006994134B2

(12) United States Patent
Grah

(10) Patent No.: US 6,994,134 B2
(45) Date of Patent: Feb. 7, 2006

(54) STRUCTURALLY SUPPORTED RESILIENT TIRE AND MATERIALS

(75) Inventor: Michael D. Grah, Simpsonville, SC (US)

(73) Assignee: Michelin Recherche et Technique S.A., (CH)

( * ) Notice: Subject to any disclaimer, the term of this patent is extended or adjusted under 35 U.S.C. 154(b) by 38 days.

(21) Appl. No.: 10/818,144

(22) Filed: Apr. 5, 2004

(65) Prior Publication Data

US 2004/0187996 A1 Sep. 30, 2004

(51) Int. Cl.
*B60C 1/00* (2006.01)
*B60C 7/00* (2006.01)
*B60C 9/18* (2006.01)

(52) U.S. Cl. ....................... 152/197; 152/246; 152/327

(58) Field of Classification Search ................ 152/197, 152/246, 300–303, 323, 325, 327–329, 516
See application file for complete search history.

(56) References Cited

U.S. PATENT DOCUMENTS 4,082,288 A * 4/1978 Martin et al.
6,769,465 B2 * 8/2004 Rhyne et al. ............... 152/197
2003/0121581 A1 * 7/2003 Thompson et al. ......... 152/301

FOREIGN PATENT DOCUMENTS

WO WO-01/42033 A1 * 6/2001
WO WO-02/83435 A1 * 10/2002

* cited by examiner

*Primary Examiner*—Adrienne C. Johnstone
(74) *Attorney, Agent, or Firm*—E. Martin Remick; Adam Arnold

(57) ABSTRACT

The invention comprises an improved non-pneumatic tire, and particularly a shear layer for a non-pneumatic tire wherein the shear layer comprises an elastomeric composition that includes a metal salt of a carboxylic acid. The shear layer preferably comprises a dienic elastomeric composition that includes a metal salt of a carboxylic acid. In one embodiment of the invention, the metal salt of the carboxylic acid is zinc diacrylate or zinc dimethacrylate. In one embodiment of the invention, the metal salt of the carboxylic acid is zinc diacrylate or zinc dimethacrylate, and a peroxide curative agent is employed.

26 Claims, 5 Drawing Sheets

STRUCTURALLY SUPPORTED RESILIENT TIRE AND MATERIALS

CROSS-REFERENCE TO RELATED APPLICATION

The application is a continuation of international application PCT/US01/42520 filed Oct. 5, 2001.

FIELD OF THE INVENTION

The present invention is in the field of non-pneumatic tires.

BACKGROUND OF THE INVENTION

The pneumatic tire has been the solution of choice for vehicular mobility for over a century. The pneumatic tire obtains its mechanical attributes largely due to the action of internal air pressure in the tire cavity. Reaction to the inflation pressure provides correct rigidities to the belt and carcass components.

Good pressure maintenance is required to obtain the best performance from a pneumatic tire. Inflation pressure below that specified by the manufacturer can result in a loss of fuel economy. Furthermore, a conventional pneumatic tire is capable of very limited use after a complete loss of inflation pressure. Many tire constructions have been proposed for continued mobility of a vehicle after a complete loss of air pressure from the tire. Some runflat tire solutions are pneumatic tires having added sidewall reinforcements to permit the sidewalls to act as load supporting members during deflated operation. Other attempts to provide runflat capability utilize essentially annular reinforcing bands in the tire crown portion. In these solutions, the rigidity of the crown portion results partly from the inherent properties of the annular reinforcing band and partly from the reaction to inflation pressure. Still other solutions rely on secondary internal support structures attached to the wheel.

A tire designed to operate without the benefit of inflation pressure would require neither pressure maintenance nor pressure monitoring. However, structurally supported resilient tires such as solid tires or other elastomeric structures to date have not provided the levels of performance expected from a conventional pneumatic tire. A structurally supported resilient tire solution that delivered pneumatic tire-like performance would be a welcome improvement.

SUMMARY OF THE INVENTION

The invention comprises an improved non-pneumatic tire, and particularly a shear layer for a non-pneumatic tire wherein the shear layer comprises an elastomeric composition that includes a metal salt of a carboxylic acid. The shear layer preferably comprises a dienic elastomeric composition that includes a metal salt of a carboxylic acid and is preferably cured with a peroxide curative agent. In one embodiment of the invention, the metal salt of the carboxylic acid is zinc diacrylate or zinc dimethacrylate.

DETAILED DESCRIPTION OF THE INVENTION

Figure 1:
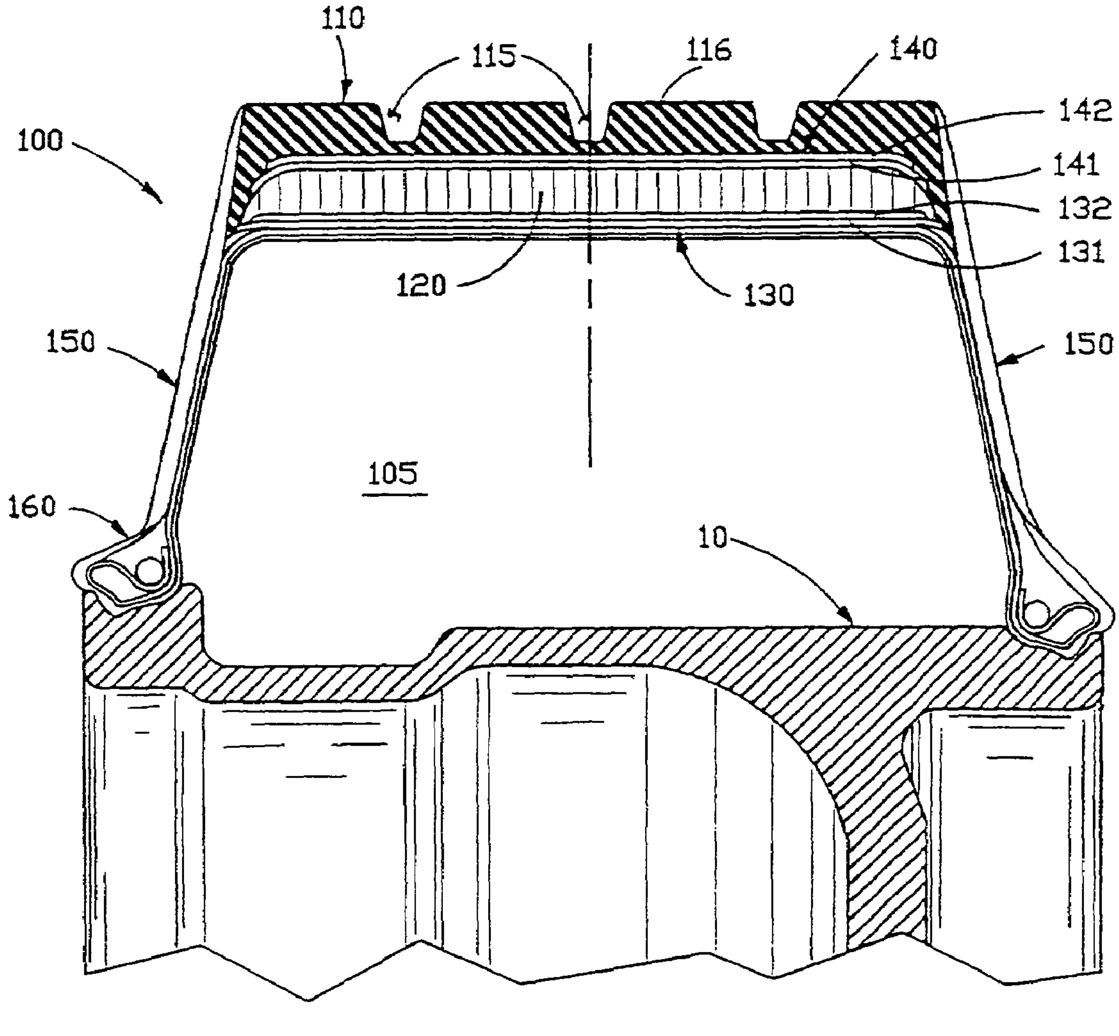
FIG. 1 is a cross section view of a structurally supported resilient tire.

The invention comprises an improved non-pneumatic tire, and particularly a shear layer for a non-pneumatic tire wherein the shear layer comprises an elastomeric composition that includes a metal salt of a carboxylic acid. The shear layer preferably comprises a dienic elastomeric composition that includes a metal salt of a carboxylic acid, and it is preferably cured with a peroxide curative agent. In one embodiment of the invention, the metal salt of the carboxylic acid is zinc diacrylate or zinc dimethacrylate.

Structurally Supported Resilient Tire

A structurally supported resilient tire supports its load solely through the structural properties of its crown, sidewall and bead portions, and without support from internal air pressure. The tire may be a radial tire, or a bias ply tire. An example of such a tire is given in WO 01/42033 to Michelin Recherche et Technique, S.A., published 14 Jun. 2001.

The crown portion of a structurally supported resilient tire, that is to say, the tire viewed without the sidewall and bead portions, appears as a tread and a reinforced annular band. The tire comprises a ground contacting tread portion, sidewall portions extending radially inward from said tread portion and anchored in bead portions adapted to remain secure to a wheel during rolling of the tire, and a reinforced annular band disposed radially inward of the tread portion. The band must comprise an elastomeric shear layer, at least a first membrane adhered to the radially inward extent of said elastomeric shear layer and at least a second membrane adhered to the radially outward extent of said elastomeric shear layer. Each of the membranes has a longitudinal tensile modulus sufficiently greater than the shear modulus of the shear layer such that deforming the ground contacting tread portion by an externally applied load from essentially a circular shape to a flat shape maintains an essentially constant length of said membranes and relative displacement of said membranes occurs by shear in said shear layer.

The following terms are defined as follows:

"Equatorial Plane" means a plane perpendicular to the axis of rotation of the tire passing through the centerline of the tire.

"Modulus" of elastomeric materials means the secant tensile modulus of elasticity at ten percent (10%) elongation (MA 10) measured per ASTM Standard Test Method D412.

"Modulus" of the membranes means the tensile modulus of elasticity at one percent (1%) elongation in the circumferential direction multiplied by the effective thickness of the membrane. This modulus can be calculated by Equation 1, below, for tire steel belt materials. This modulus is noted with a prime (') designation.

"Shear Modulus" of elastomeric materials means the shear modulus of elasticity and is defined equivalent to one-third the secant tensile modulus of elasticity measured at ten percent (10%) elongation.

"Hysteresis" means the dynamic loss tangent measured at ten percent (10%) dynamic shear strain and at 25° C.

"Structurally supported" means that the tire carries a load without the support of gas inflation pressure.

All documents cited herein are expressly incorporated by reference.

A structurally supported resilient tire is shown in FIG. 1. The tire 100 shown in FIG. 1 has a ground contacting tread portion 110, sidewall portions 150 extending radially inward from the tread portion 110, and bead portions 160 at the end of the sidewall portions. The bead portions 160 anchor the tire 100 to a wheel 10. The tread portion 110, sidewall portions 150, and bead portions 160 define a hollow, annular space 105.

A reinforced annular band is disposed radially inward of tread portion 110. In FIG. 1 the annular band comprises an elastomeric shear layer 120, a first membrane 130 having reinforced layers 131 and 132 adhered to the radially innermost extent of the elastomeric shear layer 120, and a second membrane 140 having reinforced layers 141 and 142 adhered to the radially outermost extent of the elastomeric shear layer 120.

In one embodiment the first membrane 130, layers 131 and 132 have essentially parallel cords oriented at an angle a relative to the tire equatorial plane, and the cords of the respective layers have an opposite orientation. That is, an angle $+\alpha$ in layer 131 and an angle $-\alpha$ in layer 132. Similarly for the second membrane 140, layers 141 and 142 have essentially parallel cords oriented at angles $+\beta$ and $-\beta$, respectively, to the equatorial plane. In these cases, the included angle of the cords between adjacent layers will be twice the specified angle, $\alpha$ or $\beta$. Angles $\alpha$ and $\beta$ will typically be in the range of about 10 degrees to about 45 degrees. It is not required, however, for the cords of the layer pairs in a membrane to be oriented at mutually equal and opposite angles. For example, it may be desirable for the cords of the layer pairs to be asymmetric relative to the tire equatorial plane.

Each of the layers of the first 130 and second 140 membranes comprises essentially inextensible cord reinforcements where each cord is embedded in the elastomeric coating layer which makes up 130 and 140. For a tire constructed of elastomeric materials, membranes 130 and 140 are adhered to shear layer 120 by the vulcanization of the elastomeric materials. Membranes 130 and 140 may be adhered to shear layer 120 by any suitable method of chemical or adhesive bonding or mechanical fixation.

The reinforcing elements of layers 131–132 and 141–142 may be any of several materials such as monofilaments or cords of steel, aramid or other high modulus textiles. As stated above, the cords of each of the layers 131, 132 and 141, 142 are embedded in an elastomeric coating layer which in one embodiment of the present invention has a shear modulus of about 7 MPa. In another embodiment of the invention, the shear modulus of the elastomeric coating layer might range from 5 MPa to 7 MPa. It is preferred that the shear modulus of the coating layers be greater than the shear modulus of the shear layer 120 to insure that deformation of the annular band is primarily by shear deformation within shear layer 120.

The relationship between the shear modulus G of the elastomeric shear layer 120 and the effective longitudinal tensile modulus $E'_{membrane}$ of the membranes 130 and 140 controls the deformation of the annular band under an applied load. The effective tensile modulus $E'_{membrane}$ of the membrane using tire belt materials can be estimated by the following:

$$E'_{MEMBRANE} = (2D+t)\frac{E_{RUBBER}}{2(1-v^2)}\left[\left(\frac{P}{P-D}\right)\frac{2-(1+v)\mathrm{SIN}^2(2\alpha)}{\mathrm{SIN}^4\alpha} + \left(\frac{t}{D}\right)\frac{1}{\mathrm{TAN}^2\alpha}\left(\frac{1}{\mathrm{TAN}^2\alpha} - v\right)\right] \quad (1)$$

Where: $E_{rubber}$=Secant tensile modulus of the elastomeric coating material

Figure 2A:
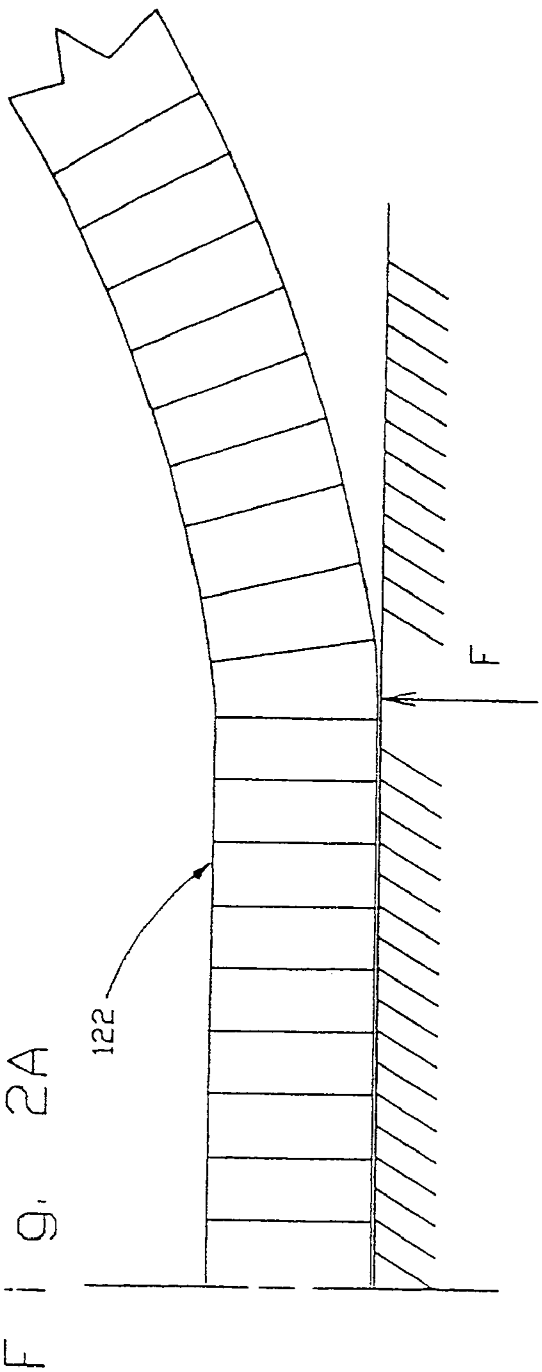
FIG. 2A is a schematic diagram illustrating the ground reaction forces for a reference homogeneous band.
Figure 2B:
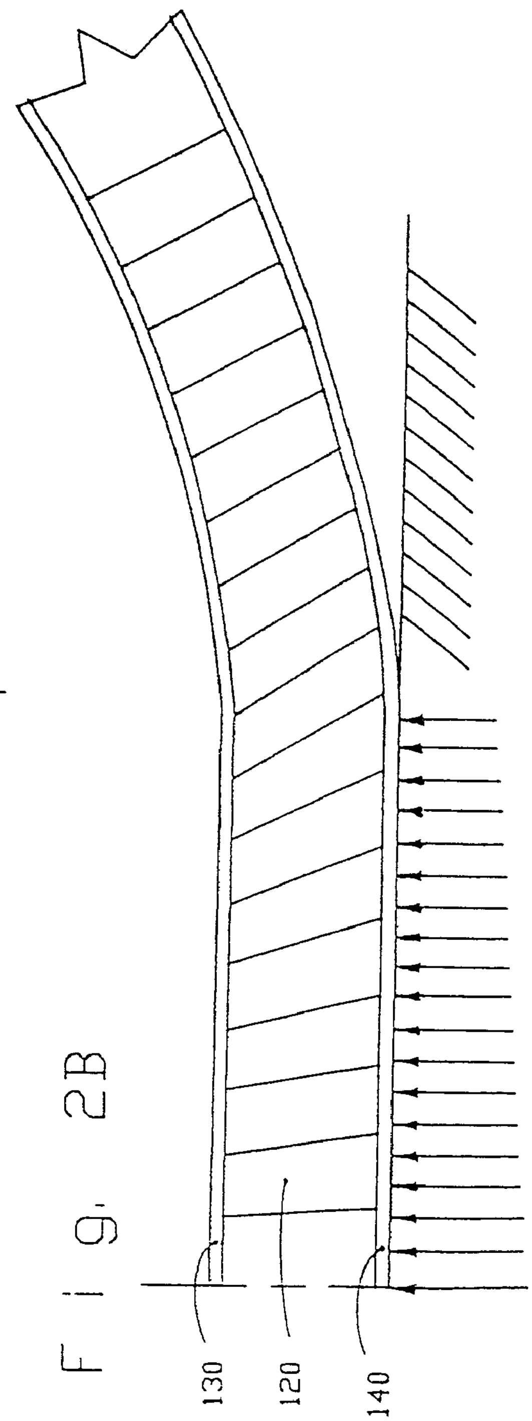
FIG. 2B is a schematic diagram illustrating the ground reaction forces for an annular band of the invention.

P=Cord pace (cord centerline spacing) measured perpendicular to the cord direction D=Cord diameter v=Poisson's ratio for the elastomeric coating material $\alpha$=Cord angle with respect to the equatorial plane t=Rubber thickness between cables in adjacent layers Note that $E'_{membrane}$ is the elastic modulus of the membrane times the thickness of the membrane. When the ratio $E'_{membrane}/G$ is relatively low, deformation of the annular band under load approximates that of a homogeneous band and produces a non-uniform ground contact pressure as shown in FIG. 2*a*. On the other hand, when the ratio $E'_{membrane}/G$ is sufficiently high, deformation of the annular band under load is essentially by shear deformation of the shear layer with little longitudinal extension or compression of the membranes. Accordingly, ground contact pressure is substantially uniform as shown in FIG. 2B.

The ratio of the longitudinal tensile modulus of the membrane $E'_{membrane}$ to the shear modulus G of the shear layer is at least about 100:1, and preferably at least about 1000:1. For membranes comprising cord reinforced layers using, for example 4×0.28 cords, a desired shear modulus of the shear layer 120 might be about 3 MPa to about 20 MPa. A more preferred range is 3 Mpa to 10 Mpa, and most preferably 3 Mpa to 7 Mpa. Repeated deformation of the shear layer 120 during rolling under load causes energy dissipation due to the hysteretic nature of the materials used. The overall heat buildup in the tire is a function of both this energy dissipation and the thickness of the shear layer. Thus, for a given tire design, the hysteresis of the shear layer should be specified to maintain tire operating temperatures below about 130° C. for tires in continuous use.

Figure 3:
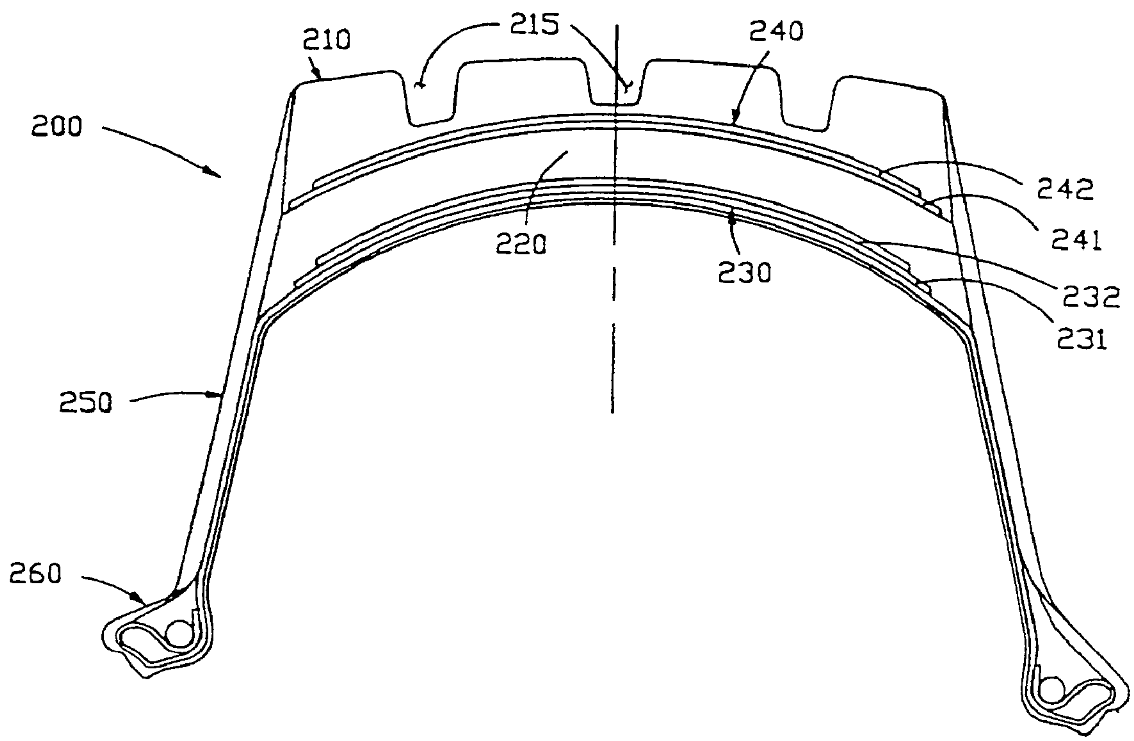
FIG. 3 is a cross section view of another embodiment of a structurally supported resilient tire of the invention having arcuate membranes.
Figure 4:
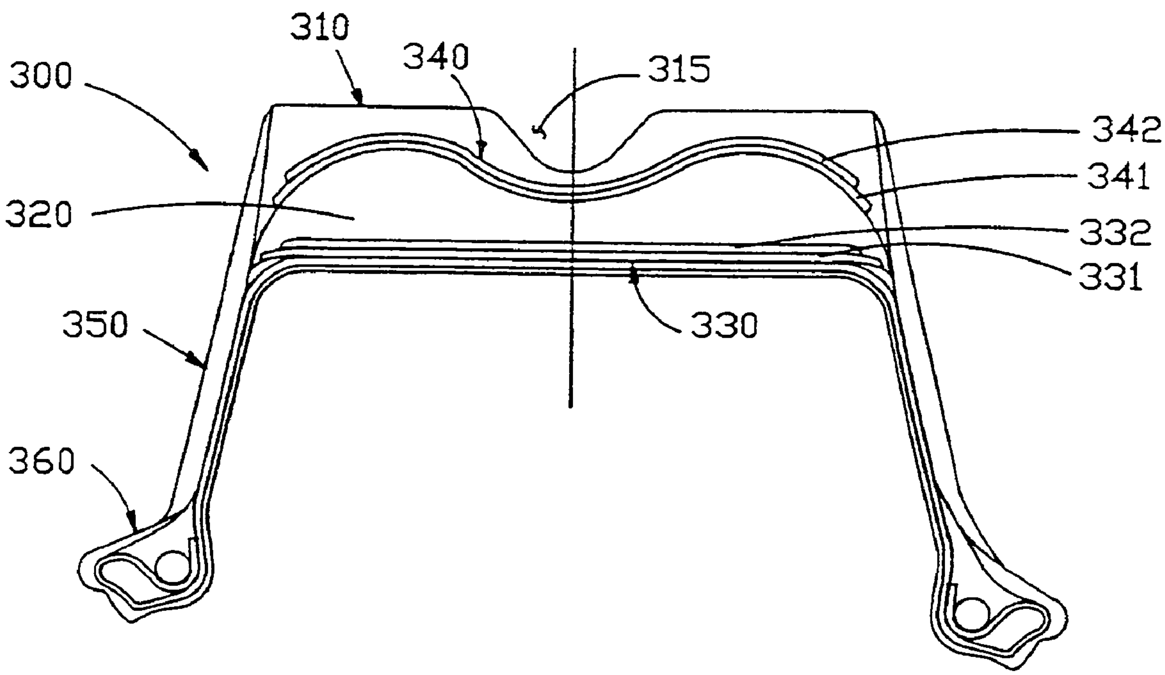
FIG. 4 is a cross section view of another embodiment of a structurally supported resilient tire of the invention having an undulating second membrane.
Figure 5:
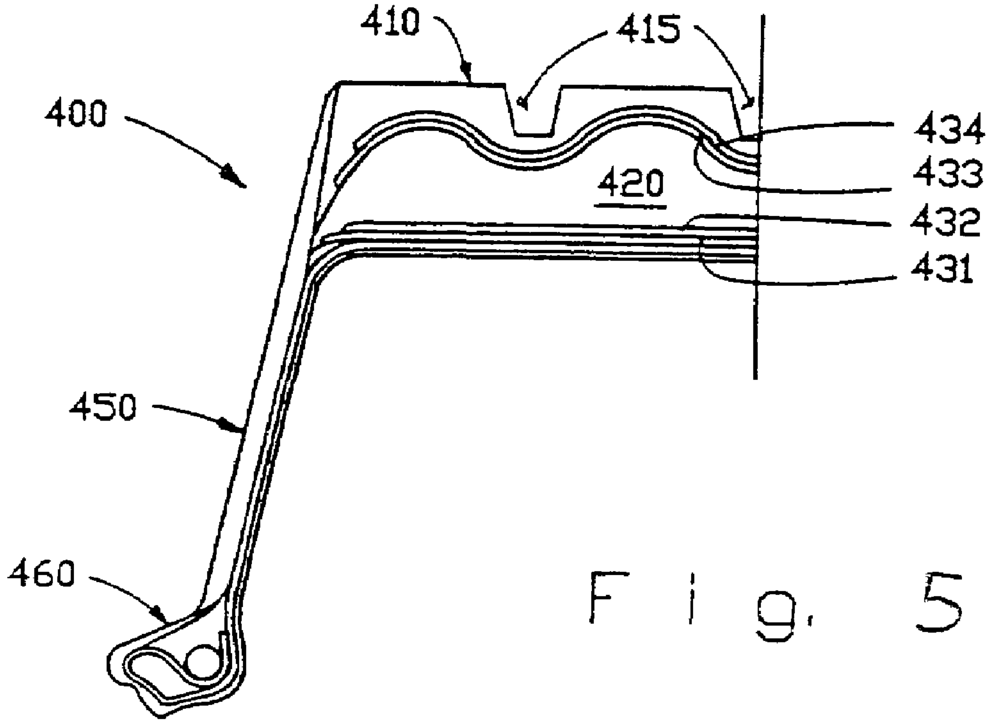
FIG. 5 is a cross section view of a variation of the embodiment of shown in FIG. 4.
Figure 6:
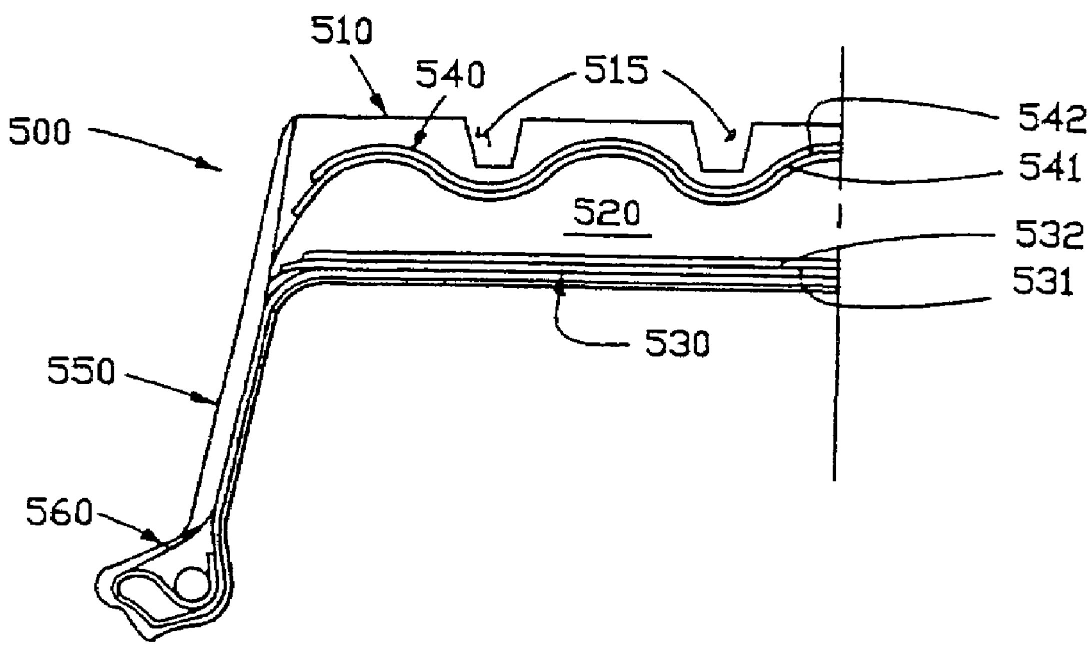
FIG. 6 is a cross section view of a variation of the embodiment of shown in FIG. 4.

FIGS. 3, 4, 5 and 6 show other embodiments of structurally supported resilient tires according to the invention. In FIG. 3, tire 200 has tread portion 210, and an annular band including shear layer 220, first membrane 230, second membrane 240. In FIG. 4, tire 300 has undulating second membrane 340, tread portion 310, shear layer 320, sidewalls 350, first membrane 330, second membrane 340, and reinforced layers 342, 341, 332, and 331. FIGS. 4 is a preferred embodiment of the invention. In FIG. 5, tire 400 has undulating second membrane 440, tread portion 410, shear layer 420, sidewalls 450, first membrane 430, second membrane 440, and reinforced layers 442, 441, 432, and 431. In FIG. 6, tire 500 has undulating second membrane 540, tread portion 510, shear layer 520, sidewalls 550, first membrane 530, second membrane 540, and reinforced layers 542, 541, 532, and 531.

Materials Suitable for the Shear Layer of the Tire of the Present Invention

Suitable Elastomers

The rubber employed in shear layer 120 may be a natural rubber or a synthetic rubber that is curable with a metal salt of a carboxylic acid and a peroxide cure system. Blends of such rubbers may also be employed. As used herein, "rubber" and "elastomer" are synonymous.

In one preferred embodiment of the invention, the shear layer comprises a diene elastomer.

"Diene" elastomer or rubber is understood to mean, in known manner, an elastomer resulting at least in part (i.e., a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the ethylene-propylene diene terpolymer (EPDM) type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

(a)—any homopolymer obtained by polymerisation of a conjugated diene monomer having 4 to 12 carbon atoms (for example, polybutadiene);

(b)—any copolymer obtained by copolymerisation of one or more dienes conjugated together or with one or more vinyl aromatic compounds having 8 to 20 carbon atoms (for example, styrene-butadiene copolymer);

(c)—a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di($C_1$–$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl- 1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert-butylstyrene, methoxystyrenes, chlorostyrenes, vinylmesitylene, divinylbenzene and vinylnaphthalene.

The copolymers in (b) above may contain between 99% and 20% by weight of diene units and between 1% and 80% by weight of vinyl aromatic units. The elastomers may have any microstructure, which is a function of the polymerisation conditions used, in particular of the presence or absence of a modifying and/or randomising agent and the quantities of modifying and/or randomising agent used. The elastomers may for example be statistical, sequential or microsequential elastomers, and may be prepared in dispersion or in solution; they may be coupled and/or starred or alternatively functionalised with a coupling and/or starring or functionalising agent.

Polybutadienes are preferably suitable, and in particular those having a content of 1,2-units of between 4% and 80%, or those having a cis-1,4 content of more than 80%, polyisoprenes, butadiene-styrene copolymers, and in particular those having a styrene content of between 5% and 50% by weight and, more particularly, between 20% and 40%, a content of 1,2-bonds of the butadiene part of between 4% and 65%, and a content of trans-1,4 bonds of between 20% and 80%, butadiene-isoprene copolymers and in particular those having an isoprene content of between 5% and 90% by weight and a glass transition temperature ("Tg" measured according to ASTM D3418-82) of −40° C. to −80° C., isoprene-styrene copolymers and in particular those having a styrene content of between 5% and 50% by weight and a Tg of between −25° C. and −50° C. In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2- plus 3,4-units of the isoprene part of between 5% and 70%, and a content of trans-1,4 units of the isoprene part of between 10% and 50%, and more generally any butadiene-styrene-isoprene copolymer having a Tg of between −20° C. and −70° C.

In summary, particularly preferably, the diene elastomer of the composition according to the invention is selected from the group of highly unsaturated diene elastomers which consists of polybutadienes (BR), polyisoprenes (IR), natural rubber (NR), butadiene copolymers, isoprene copolymers and mixtures of these elastomers.

If a copolymer is used, the preferred are selected from the group which consists of butadiene-styrene copolymers (SBR), butadiene-isoprene copolymers (BIR), isoprene-styrene copolymers (SIR) and isoprene-butadiene-styrene copolymers (SBIR).

Still more preferably, the dienic elastomer is selected from the group consisting of natural rubber, synthetic cis-1,4 polyisoprenes and mixtures thereof. These synthetic cis-1,4 polyisoprenes have preferably a rate (mol %) of cis-1,4 bonds which is more than 90%, more preferably more than 98%.

Of course, the compositions of the invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

Metal Salt of a Carboxylic Acid

The carboxylic acid is an unsaturated carboxylic acid. In one embodiment of the invention, the carboxylic acid is selected from the group consisting of methacrylic acid, ethacrylic acid, acrylic acid, cinnamic acid, crotonic acid, maleic acid, fumaric acid, itaconic acid, and mixtures thereof. Preferred carboxylic acids include acrylic acid and methacrylic acid.

The metal may comprise a metal selected from the group consisting of sodium, potassium, iron, magnesium, calcium, zinc, barium, aluminum, tin, zirconium, lithium, cadmium, and cobalt and mixtures thereof. Zinc is preferred.

Preferred metal salts include zinc dimethacrylate and zinc diacrylate. [See also Sartomer Co., Inc., "New Metallic Coagents for Curing Elastomers", April 1998. Other suitable acrylates are disclosed in Sartomer Co., Inc., Sartomer Application Bulletin, May 1998, "Chemical Intermediates—Design Unique Polymers with Sartomer's Specialty Monomers," and Sartomer Co., Inc., Sartomer Application Bulletin, October 1999, "Glass Transition Temperatures of Sartomer Products."

Peroxides

Peroxides which may be employed to catalyze the curing of the elastomer of the shear layer (120) include, but are not limited to: di-cumyl peroxide; tert-butyl cumyl peroxide; 2,5-dimethyl-2,5 BIS(tert-butyl peroxy)hexyne-3; BIS(tert-butyl peroxy isopropyl)benzene; 4,4-di-tert-butyl peroxy N-butyl valerate; 1,1-di-tert-butylperoxy- 3,3,5-trimethylcyclohexane; bis-(tert-butyl peroxy)-diisopropyl benzene; t-butyl perbenzoate; di-tert-butyl peroxide; 2,5-dimethyl-2, 5-di-tert-butylperoxide hexane, etc. [see also Sartomer Co., Inc., "Sartomer Application Bulletin: Basic Principles of Peroxide-Coagent Curing of Elastomers," April 1997, incorporated by reference.] Amounts of peroxide curing agents included in the composition will depend upon the elastomer and coagent loading utilized. In general, such amounts may range from about 0.5 parts per hundred weight of elastomer to about 5.0 parts per hundred weight of elastomer. A more preferred range is from about 0.5 parts per hundred peroxide per hundred weight of elastomer to about 5.0 parts per hundred weight of elastomer.

Other free radical generating compounds and mechanisms can also be employed, such as ultraviolet light, beta and gamma radiation, azo compounds such as 2',2'-azobisisobutyronitrile, 2,2'-azobis(2,4-dimethylpentanenitrile), 1,1'-azobis(cyclohexanecarbonitrile), disulfides (RS-SR), and tetrazenes ($R_2N{-}N{=}N{-}NR_2$).

Fillers

Suitable fillers include carbon black as well as inorganic fillers ("white fillers") such as silica, aluminas, aluminum hydroxide, clays, calcium carbonate, glass fibers, microspheres, polymeric fibers such as polyester, nylon, or aramid fibers. The appropriate level of filler would be known to one of skill in the art after reading the present specification.

White Fillers

The white or inorganic filler used as reinforcing filler may constitute all or only part of the total reinforcing filler, in this latter case associated, for example, with carbon black. In the present application, "reinforcing inorganic filler", in known manner, is understood to mean an inorganic or mineral filler, whatever its colour and its origin (natural or synthetic), also referred to as "white" filler or sometimes "clear" filler in contrast to carbon black, this inorganic filler being capable, on its own, without any other means than an intermediate coupling agent, of reinforcing a rubber composition intended for the manufacture of tyres, in other words which is capable of replacing a conventional tyre-grade carbon black filler in its reinforcement function.

In one embodiment of the invention, the reinforcing inorganic filler is a mineral filler of the siliceous or aluminous type, or a mixture of these two types of fillers. The silica ($SiO_2$) used may be any reinforcing silica known to the person skilled in the art, in particular any precipitated or pyrogenic silica having a BET surface area and a specific CTAB surface area both of which are less than 450 $m^2/g$, preferably from 30 to 400 $m^2/g$. Highly dispersible precipitated silicas (referred to as "HDS") are preferred, in particular when the invention is used for the manufacture of tyres having a low rolling resistance; "highly dispersible silica" is understood in known manner to mean any silica having a substantial ability to disagglomerate and to disperse in an elastomeric matrix, which can be observed in known manner by electron or optical microscopy on thin sections. As non-limiting examples of such preferred highly dispersible silicas, mention may be made of the silicas BV3380 and Ultrasil 7000 from Degussa, the silicas Zeosil 1165 MP and 1115 MP from Rhodia, the silica Hi-Sil 2000 from PPG Industries, Inc. (Pittsburgh, Pa. 15272), the silicas Zeopol 8715 or 8745 from J.M. Huber Corp. (Atlanta, Ga. 30327).

The reinforcing alumina ($Al_2O_3$) preferably used is a highly dispersible alumina having a BET surface area from 30 to 400 $m^2/g$, more preferably between 60 and 250 $m^2/g$, an average particle size at most equal to 500 nm, more preferably at most equal to 200 nm, as described in the aforementioned application EP-A-0 810 258. Non-limitative examples of such reinforcing aluminas are in particular the aluminas A125 or CR125 (from Baïkowski Intl. Corp., Charlotte, N.C.), APA-100RDX (from Condea Servo BV, Netherlands), Aluminoxid C (from Degussa) or AKP-G015 (Sumitomo Chemical Co. Ltd., Osaka, Japan). The invention can also be implemented by using as reinforcing inorganic filler the specific aluminium (oxide-)hydroxides such as described in application W099/28376.

The physical state in which the reinforcing inorganic filler is present is immaterial, whether it be in the form of a powder, microbeads, granules or alternatively balls. Of course, "reinforcing inorganic filler" is also understood to mean mixtures of different reinforcing inorganic fillers, in particular of highly dispersible siliceous and/or aluminous fillers such as described above.

The reinforcing inorganic filler may also be used in a blend (mixture) with carbon black. Suitable carbon blacks are any carbon blacks, in particular the blacks of the type HAF, ISAF and SAF, which are conventionally used in tyres. The amount of carbon black present in the total reinforcing filler may vary within wide limits.

In the present specification, the BET specific surface area is determined in accordance with the method of Brunauer, Emmet and Teller described in "The Journal of the American Chemical Society", vol. 60, page 309, February 1938. The CTAB specific surface area is the external surface area determined in accordance with the method.

Coupling Agents Useful with the Present Invention

In the case of inorganic fillers such as silica, a coupling agent is needed to link the elastomer with the filler. The term "coupling agent" (inorganic filler/elastomer) is understood in known manner to mean an agent capable of establishing a sufficient chemical and/or physical connection between the inorganic filler and the elastomer; such a coupling agent, which is at least bifunctional, has, for example, the simplified general formula "Y-T-X", in which:

- Y represents a functional group ("Y" function) which is capable of bonding physically and/or chemically with the inorganic filler, such a bond being able to be established, for example, between a silicon atom of the coupling agent and the hydroxyl (OH) surface groups of the inorganic filler (for example, surface silanols in the case of silica);
- X represents a functional group ("X" function) which is capable of bonding physically and/or chemically with the elastomer, for example by means of a sulphur atom;
- T represents a hydrocarbon group making it possible to link Y and X.

The coupling agents must particularly not be confused with simple agents for covering the inorganic filler which, in known manner, may comprise the Y function which is active with respect to the inorganic filler but are devoid of the X function which is active with respect to the elastomer.

Such coupling agents, of variable effectiveness, have been described in a very large number of documents and are well-known to the person skilled in the art. In fact, any coupling agent known to or likely to ensure, in the diene rubber compositions which can be used for the manufacture of tyres, the effective bonding or coupling between the silica and diene elastomer may be used, such as, for example, organosilanes, in particular polysulphurised alkoxysilanes or mercaptosilanes, or polyorganosiloxanes bearing the X and Y functions mentioned above.

The person skilled in the art will be able to adjust the content of coupling agent in the compositions of the invention, according to the intended application, the nature of the elastomer used, and the quantity of inorganic reinforcing filler.

Other Materials

The rubber compositions according to the invention may also contain, in addition to the elastomer(s), reinforcing filler, sulphur and one or more reinforcing white filler/elastomer bonding agent(s), various other constituents and additives usually used in rubber mixtures, such as plasticizers, pigments, antioxidants, vulcanization accelerators, extender oils, processing aids, and one or more agents for coating the reinforcing white filler, such as alkoxysilanes, polyols, amines etc.

Formulations

The rubber compositions are produced in suitable mixers, typically using two successive preparation phases, a first phase of thermomechanical working at high temperature, followed by a second phase of mechanical working at lower temperature. In the case of a silica mix, a three-step process may be employed. One suitable mixer is a Banbury mixer (Farrel Corp., Ansonia, Conn. 06401).

The first phase of thermomechanical working (sometimes referred to as "non-productive" phase) is intended to mix thoroughly, by kneading, the various ingredients of the composition, with the exception of the reticulation (curing) system. It is carried out in a suitable kneading device, such as an internal mixer or an extruder, until, under the action of the mechanical working and the high shearing imposed on the mixture, a maximum temperature generally between 120° C. and 190° C., preferably between 130° C. and 180° C., is reached.

This first phase may itself comprise a single or several thermomechanical working stages, separated for example by one or more intermediate cooling stages. The various ingredients of the composition, elastomer(s), reinforcing filler and its coupling agent, and the various other components ("additives") may be incorporated in the mixer in one or more steps, either during the first thermomechanical stage, or staggered during the various thermomechanical stages, if applicable. The total duration of this thermomechanical working (typically between 1 and 20 minutes, for example between 2 and 10 minutes) is selected according to the specific operating conditions, in particular the maximum temperature selected, the nature and volume of the constituents, the important thing being that a good dispersion of the various ingredients which inter-react is obtained in the elastomeric matrix, thus permitting firstly good processing of the composition in the uncured state, then a sufficient level of reinforcement, after curing, by the reinforcing filler and its intermediate coupling agent.

According to a preferred embodiment of the process according to the invention, all the base constituents of the compositions according to the invention, namely (ii) the reinforcing inorganic filler and its coupling agent are incorporated in (i) the diene elastomer during the first, so-called non-productive, phase, that is to say that at least these different base constituents are introduced into the mixer and are kneaded thermomechanically, in one or more stages, until a maximum temperature of between 120° C. and 190° C., preferably between 130° C. and 180° C., is reached.

By way of example, the first (non-productive) phase is carried out in two successive steps of a duration of 1 to 5 minutes, in a conventional internal blade mixer of the "Banbury" type, the initial tank temperature of which is of the order of 60° C. First of all the elastomer (or the elastomers) is introduced, then, after for example 1 minute's kneading, the reinforcing filler and its coupling agent; kneading is continued then, for example 1 minute later, the various additives are added, including any possible complementary covering agents or processing agents, with the exception of the vulcanisation system. When the apparent density of the reinforcing filler (or of one of the reinforcing fillers if several are used) is relatively low (as is the case, for example, of silicas), it may be preferable to divide the introduction of the latter, and if applicable that of its coupling system, into several steps in order to facilitate the incorporation thereof in the elastomeric matrix, for example half or even about ¾ of the filler after the first minute's kneading, the rest after two minutes' kneading. The thermomechanical working is thus carried out until a maximum temperature, referred to as "dropping" temperature, is obtained, which might be between 135° C. and 170° C. The block of mix thus obtained is recovered and is cooled to a temperature of less than 100° C. After cooling, a second thermomechanical stage is carried out in the same or a different mixer, with the aim of subjecting the mix to complementary heat treatment and obtaining in particular better dispersion of the reinforcing filler; of course, some of the additives, such as, for example, the stearic acid, the anti-ozone wax, the antioxidant, the zinc oxide or other additive, may not be introduced into the mixer, in their entirety or in part, until this second stage of thermomechanical working. The result of this first thermomechanical phase is then taken up on an external open mill, at low temperature (for example between 30° C. and 60° C.) and the vulcanisation system is added; the entire composition is then mixed (productive phase) for several minutes, for example between 2 and 5 minutes.

Elastomer is added first to the mixer, in the first non-productive step. Filler is then added (e.g., carbon black), and the material is dropped from the mixer. In the second step, the curative agent is added at the lower temperature. The metal salt of the carboxylic acid may be added in the productive or the non-productive mixing step.

For a silica-based composition, in the first step the silica filler and a coupling agent (e.g., Si-69) are added and mixed for a time appropriate to achieve coupling of the silane and silica. The mixture is then dropped. The batch of silica-silane is then combined with peroxides and the metal salt of the carboxylic acid (e.g., zinc dimethacrylate) and other additives. Alternatively, peroxide and an additive such as zinc oxide may be added at a lower temperature on the mill. Addition of at least 4 parts per hundred zinc stearate per hundred weight of elastomer reduces adherence of the mix to the processing equipment.

The final composition thus obtained is then calendered, for example in the form of a film or a sheet, in particular for characterisation in the laboratory, or alternatively extruded, in order to form for example a rubber profiled element used for manufacturing the shear layer of the present invention.

The reticulation (or curing) is carried out in known manner at a temperature generally between 130° C. and 200° C., preferably under pressure, for a sufficient time which may vary, for example, between 5 and 90 minutes, depending, in particular, on the curing temperature, the cross-linking system adopted and the vulcanisation kinetics of the composition in question.

In one embodiment of the invention, the shear layer has a shear modulus of elasticity from about 3 MPa to about 20 MPa. In other embodiments of the invention, the shear layer has the following approximate modulus ranges.

3 MPa to 5 MPa
6 MPa to 8 MPa
9MPa to 11 MPa
12 MPa to 14 MPa
14 MPa to 16 MPa
17 MPa to 20 MPa
3 MPa to 7 MPa
3 MPa to 10 MPa
11 MPa to 20 MPa

The inventors have discovered that the different ranges of modulus have utilities for different classes of vehicles. The inventors have found that structurally supported resilient tires for different classes of vehicles have different requirements in terms of hysteresis, elasticity, and cohesiveness. The inventors found that adding a resin to obtain sufficient shear modulus for a conventional rubber might result in a product that lacks the cohesiveness to function as a shear layer. That is to say, the shear layer might be prone to tearing. Conventional methods of increasing the cohesiveness of such a rubber mix, such as increasing the sulfur content, or adding more accelerator, can make the rubber brittle, less elastic, and difficult to process. Again, such a mix is not suitable for the shear layer of the present invention. The inventors found that use of a metal salt of an acrylic acid, and in particular zinc dimethacrylate and zinc diacrylate, results in a composition that is easy to process, can give the necessary modulus for the shear layer for each class of vehicle, and has high elasticity and cohesive strength.

In General (1) The following is a general formulation of the shear layer according to the present invention. It is expressed in "phr" (parts by weight per hundred parts of elastomer or rubber). "ZDMA" means zinc dimethacryfate.

| | |
|---|---|
| Elastomer | 100 phr |
| Metal salt of carboxylic acid | 30 phr (10–60 phr) |
| Peroxide | 1 phr (0.1–5 phr) |
| Filler | 45 phr (30–70 phr) |

(2) The following is a preferred formulation of the shear layer according to the present invention.

| | |
|---|---|
| Natural Rubber | 100 phr |
| Zinc methacrylate or dimethacrylate | 30 phr (15–40 phr) |
| Peroxide | 1 phr (0.5–2 phr) |
| Filler | 45 phr (30–60 phr) |

(3) The following is a formulation for a sports car. A sports car is expected to reach high speed (e.g., one hundred and fifty miles per hour) with corresponding high hysteresis. The tire might undergo low deflection (i.e., travel mainly on smooth roads and highways), and support only moderate load (two to three passengers, no luggage—perhaps 400 kilograms per tire). Such a tire might require a "V" (149 mph); "W" (168 mph), or "Y" (186 mph) speed rating. The following is a formulation for the shear layer:

| | |
|---|---|
| Natural Rubber | 35 phr (30–65 phr) |
| Polybutadiene | 65 phr (35–70 phr) |
| Peroxide | 1 phr (0.5–2 phr) |
| Carbon black (e.g., N650) | 50 phr (30–60 phr) |
| Zinc dimethacrylate | 15 phr (10–20 phr) |

(4) The following is a formulation for an industrial tire. An industrial tire, for example a Bobcat tire or a tractor tire can be used at low speed (e.g., 5–10 m.p.h.), at a high load per tire (i.e., 1600 kilograms), with high deflections (i.e., travel over rocks). Therefore, cohesion of the tire material would be quite important (the ability of the material to resist splitting and tearing). It might need a large tread area to contact the ground. The following is a formulation for the shear layer:

| | |
|---|---|
| Natural Rubber | 100 phr (80–100 phr) |
| Polybutadiene | 0 phr (0–20 phr) |
| Peroxide | 1 phr (0.5–2 phr) |
| Carbon black | 0 phr |
| Silica | 45 phr (40–70 phr) |
| ZDMA | 40 phr (20–50 phr) |

(5) For a passenger car tire, where the tire would be used at moderate speeds (e.g., up to 118 m.p.h.), with moderate loads (e.g., two adult passengers with no luggage, about 400 kilograms per tire) and moderate deflections (i.e., mainly on good roads), the following is a formulation for the shear layer.

| | |
|---|---|
| Natural rubber | 80 phr (50–90 phr) |
| Polybutadiene | 20 phr (10–50 phr) |
| Peroxide | 1 phr (0.5–2.0 phr) |
| Carbon black (e.g., N650) | 30 phr (30–60 phr) |
| ZDMA | 35 phr (20–40 phr) |

The invention may be further understood with reference to the following non-limiting examples.

EXAMPLE 1

Elastomeric materials for the shear layer were prepared according to the present invention.

TABLE 1

| | Control 1 | Control 2 | Control 3 | Mix 1 | Mix 2 | Mix 3 | Mix 4 | Mix 5 |
|---|---|---|---|---|---|---|---|---|
| Natural Rubber | 35 | 35 | 100 | 35 | 80 | 100 | 100 | 80 |
| Polybutadiene | 65 | 65 | | 65 | 20 | | | 20 |

TABLE 1-continued

| | Control 1 | Control 2 | Control 3 | Mix 1 | Mix 2 | Mix 3 | Mix 4 | Mix 5 |
|---|---|---|---|---|---|---|---|---|
| Zeosil 1165 MP (Silica) | | | 62 | | | 45 | 45 | 45 |
| N650 (carbon black) | 65 | 65 | | 50 | 30 | | | |
| X50S (silane coupler) | | | 9.9 | | | 5.8 | 5.8 | 5.8 |
| Peroxide (dicup 40 C [40%]) | | | | | 5 | 2.5 | 2.5 | 2.5 |
| Zinc dimethacrylate | | | | 15 | 35 | 40 | 40 | 40 |
| ZnO | 4 | 4 | 4 | | 4 | 4 | 4 | 4 |

[The figures are expressed in parts by weight per hundred parts of elastomer of rubber]

[highly dispersible silica "Zeosil 1165MP" manufacture by the Rhodia in the form of micropearls (BET and CTAB: approximately 150–160 $m^2/g$)]

[N650 carbon black is available from Engineered Carbons, Inc, Borger, Tex. 79008, and other suppliers]

[Si69 is bis(3-triethoxysilylpropyl)tetrasulphide having the formula $[(C_2H_5O)_3Si(CH_2)_3S_2]_2$ by Degussa Corp. (Ridgefield Park, N.J.) under the name Si69 (or X50S when supported at a content of 50 percent by weight on carbon black)]

Dynamic properties were measured on an MTS loading rig (MTS Systems Corp., Eden Prairie, Minn. 55344) at 10 hertz under pure shear mode of deformation.

Under tensile loading, the force divided by the original area of the sample under duress is called the stress (shown above in units of mega Pascals). The displacement (movement or stretch) of the material is called the strain. Normally the strain is given as the change in length divided by the original length, and the units are dimensionless. The modulus is the slope of the curve of stress versus strain (stress in the ordinate, strain in the abscissa). The elastic shear modulus (G') of a material is the ratio of the elastic (in-phase)

TABLE 2

| | Control 1 | Control 2 | Control 3 | Mix 1 | Mix 2 | Mix 3 | Mix 4 | Mix 5 |
|---|---|---|---|---|---|---|---|---|
| Mooney Viscosity (1) | 83 | 85 | 83 | 56 | 39 | 49 | 48 | 55 |
| MA 10 (MPa) (2) | 12 | 10 | 12 | 16 | 21 | 10 | 17 | 21 |
| MA 50 (MPa) (3) | 9.2 | 7.5 | 6.7 | 12.5 | 11.2 | 4.9 | 7.3 | 9.4 |
| MA 100 (MPa) (4) | 9.6 | 6.6 | 6 | Broke | 10 | 4 | 5.7 | 7.3 |
| G' at 10% shear strain (5) | 4.9 | 3.1 | 4 | 4.9 | | | | |
| G' at 40% shear strain (5) | Glue broke | 2.9 | 3.1 | 4.5 | | | | |
| Tangent delta at 10% shear (5) | 0.045 | 0.046 | 0.077 | 0.041 | | | | |
| Tangent delta at 40% shear (5) | Glue broke | 0.034 | 0.078 | 0.038 | | | | |
| P60(rebound 60° C.) | 9 | 12.5 | 21 | 12 | 22 | 27 | 30 | 29 |
| Elastic shear limit (%) 100° C. | >50% | >50% | >100% | >50% | >100% | >100% | >100% | >100% |
| Cohesive Stress (MPa) 100° C. (6) | | | 14.8 | 7.4 | 9.9 | 14.8 | 14.9 | 13.3 |
| Cohesive Strain (MPa) 100° C. (7) | | | 213 | 50 | 90 | 395 | 332 | 246 |
| Dimensional stability (8) | 2 | 2 | 2 | 1 | 1 | 1 | 1 | 1 |
| Aging Stability (9) | 3 | 2 | 3 | 1 | 1 | 1 | 1 | 1 |
| Proposed Application | | | | Corvette tourism | Corvette Tourism | Industrial Skid-Steer Military wheelchair | Industrial Skid-Steer Military wheelchair | Industrial Skid-Steer Military wheelchair |

(1) ML(1 + 4) 100° C. Lower no. = lower viscosity
(2) Tensile modulus at 10% strain, 23° C.
(3) Tensile modulus at 50% strain, 23° C.
(4) Tensile modulus at 100% strain, 23° C.
(5) 10 hz, 100° C.
(6) Scott ultimate stress @ 100° C.
(7) Scott ultimate strain to rupture 100° C.
(8) Relative (based on MTS), "1" is best, "3" is worst.
(9) Relative, "1" is best, "3" is worst stress to strain and relates to the ability of a material to store energy elastically. The loss modulus (G") of a material is the ratio of the viscous (out of phase) component to the shear strain, and is related to the material's ability to dissipate stress through heat. The ratio of these moduli (G'/G") is defined as tangent delta, and indicates the relative degree of viscous to elastic dissipation, or damping of the material. A low tan delta means higher resilience and less hysteresis.

G' represents the shear modulus in mega Pascals, and tan delta represents the relative hysteresis of the material.

ML(1+4) 100° C. Lower no.=lower viscosity. This is the Mooney viscosity test carried out with a large rotor. It is pre-heated for one minute while stationary, and rotated for four minutes test time. The values are read at the end of five minutes.

MA10, MA50 and MA100 are tensile modulus tests, at 10%, 50% and 100% elongation, respectively. They are measured using an Instron tensile tester (Instron, Inc. Canton, Mass. 02101).

The test for tangent delta at 10% shear, and at 40% shear are carried out using an MTS, Inc. tester machine (MTS Systems Corporation, Eden Prairie, Minn. 55344).

The P60 test is a hysteresis test measuring the angle of rebound of a pendulum as it hits a rubber sample. The first five initial strikes are ignored, then the next three strikes are measured.

The elastic shear limit test is carried out with an MTS tester. A sample is stretched until its stress/strain curve goes outside the linear region.

In the Scott ultimate stress test, a sample is stretched to rupture. The sample is stretched at a constant speed.

The dimensional stability test is carried out on an MTS tester.

The aging test is carried out on an MTS machine after aging the sample for 7, 14, or 28 days at 77 degrees centigrade.

The tables demonstrate that by using the metal salt of a carboxylic acid with a free radical generator (ZDMA with peroxide), along with a filler such as carbon black or silica, a set of properties can be obtained that are superior to those of a conventional rubber system. That is to say the present invention can achieve the best characteristics for the shear layer of a structurally supported resilient tire such as high modulus, high elasticity, and high cohesive strength. The shear layer of the present invention can also be formulated to provide high modulus, high elasticity, and low hysteresis.

Various modifications of the present invention will be apparent to one of skill in the art after reading the foregoing specification, the appended claims, and the attached drawings. These modifications are meant to fall within the scope of the appended claims.

I claim:

1. An structurally-supported resilient tire comprising a tread, sidewall portions extending radially inward from the tread portion, and bead portions at the end of the sidewall, and further comprising an annular band disposed radially inward of the tread portion, wherein the annular band comprises an elastomeric shear layer, a first membrane adhered to the radially innermost extent of the elastomeric shear layer, and a second membrane adhered to the radially outermost extent of the elastomeric shear layer, the improvement of which comprises the use of a shear layer comprising an elastomeric composition having a metal salt of a carboxylic acid.

2. The tire of claim 1, wherein the tire is selected from the group consisting of radial tires and bias ply tires.

3. The tire of claim 1 wherein the elastomeric composition is selected from the group consisting of natural and synthetic elastomers, and mixtures thereof.

4. A structurally-supported resilient tire comprising a tread, sidewall portions extending radially inward from the tread portion, and bead portions at the end of the sidewall, and further comprising an annular band disposed radially inward of the tread portion, wherein the annular band comprises an elastomeric shear layer, a first membrane adhered to the radially innermost extent of the elastomeric shear layer, and a second membrane adhered to the radially outermost extent of the elastomeric shear layer, the improvement of which comprises the use of a shear layer comprising an elastomeric composition having a metal salt of a carboxylic acid, and wherein the elastomeric composition is selected from the group consisting of dienic elastomers.

5. The tire of claim 4, wherein the dienic elastomer is selected from the group consisting of polybutadienes, polyisoprenes, butadiene copolymers, isoprene copolymers and mixtures thereof.

6. The tire of claim 4, wherein the elastomer is selected from the group consisting of natural rubber, synthetic poloyisoprenes, styrene-butadiene copolymers, butadiene-isoprene copolymers, isoprene-butadiene-styrene copolymers, and mixtures thereof.

7. The tire of claim 4, wherein the dienic elastomer is selected from the group consisting of natural rubber, synthetic cis-1,4 polyisoprenes, and mixtures thereof.

8. A structurally-supported resilient tire comprising a tread, sidewall portions extending radially inward from the tread portion, and bead portions at the end of the sidewall, and further comprising an annular band disposed radially inward of the tread portion, wherein the annular band comprises an elastomeric shear layer, a first membrane adhered to the radially innermost extent of the elastomeric shear layer, and a second membrane adhered to the radially outermost extent of the elastomeric shear layer, the improvement of which comprises the use of a shear layer comprising an elastomeric composition having a metal salt of a carboxylic acid, and wherein the carboxylic acid is selected from the group consisting of unsaturated carboxylic acids.

9. The tire of claim 8, wherein the carboxylic acids are selected from the group consisting of methacrylic acid, ethacrylic acid, acrylic acid, cinnamic acid, crotonic acid, maleic acid, fumaric acid, itaconic acid, and mixtures thereof.

10. The tire of claim 1, wherein the metal of the metal salt is selected from the group consisting of sodium, potassium, iron, magnesium; calcium, zinc, barium, aluminum, tin, zirconium, lithium, cadmium, cobalt and mixtures thereof.

11. A structurally-supported resilient tire comprising a tread, sidewall portions extending radially inward from the tread portion, and bead portions at the end of the sidewall, and further comprising an annular band disposed radially inward of the tread portion, wherein the annular band comprises an elastomeric shear layer, a first membrane adhered to the radially innermost extent of the elastomeric shear layer, and a second membrane adhered to the radially outermost extent of the elastomeric shear layer, the improvement of which comprises the use of a shear layer comprising an elastomeric composition having a metal salt of a carboxylic acid, and wherein the metal salt is selected from the group consisting of zinc diacrylate and zinc dimethacrylate.

12. The tire of claim 1, wherein the elastomer further includes a curing agent comprising a composition producing free radicals.

13. The tire of claim 12, wherein the curing agent is selected from the group consisting of peroxides, azo compounds, disulfides, and tetrazenes.

14. The tire of claim 13, wherein the curing agent is a peroxide.

15. The tire of claim 14, wherein the peroxide is selected from the group consisting of di-cumyl peroxide; tert-butyl cumyl peroxide; 2,5-dimethyl-2,5 BIS (tert-butyl peroxy) hexyne-3; BIS(tert-butyl peroxy isopropyl)benzene; 4,4-di-tert-butyl peroxy N-butyl valerate; 1,1-di-tert-butylperoxy-3,3,5-trimethylcyclohexane; bis-(tert-butyl peroxy)-diisopropyl benzene; t-butyl perbenzoate; di-tert-butyl peroxide; 2,5-dimethyl-2,5-di-tert-butylperoxide hexane and mixtures thereof.

16. The tire according to claim 1 wherein said elastomeric shear layer has a shear modulus of elasticity of about 3 MPa to about 20 MPa.

17. The tire according to claim 1 wherein said elastomeric shear layer has a shear modulus of elasticity of about 3 MPa to about 10 MPa.

18. A structurally-supported resilient tire comprising a tread, sidewall portions extending radially inward from the tread portion, and bead portions at the end of the sidewall, and further comprising an annular band disposed radially inward of the tread portion, wherein the annular band comprises an elastomeric shear layer, a first membrane adhered to the radially innermost extent of the elastomeric shear layer, and a second membrane adhered to the radially outermost extent of the elastomeric shear layer, the improvement of which comprises the use of a shear layer comprising an elastomeric composition having a metal salt of a carboxylic acid, wherein said elastomeric shear layer has a shear modulus of elasticity of about 3 MPa to about 7 MPa.

19. The tire according to claim 1 wherein a ratio of the longitudinal tensile of one of said membranes to the shear modulus of said shear layer is at least about 100:1.

20. The tire according to claim 1 wherein the ratio of the longitudinal tensile modulus of one of said membranes to the shear modulus of said shear layer is at least about 1000:1.

21. A structurally-supported resilient tire comprising a tread, sidewall portions extending radially inward from the tread portion, and bead portions at the end of the sidewall, and further comprising an annular band disposed radially inward of the tread portion, wherein the annular band comprises an elastomeric shear layer, a first membrane adhered to the radially innermost extent of the elastomeric shear layer, and a second membrane adhered to the radially outermost extent of the elastomeric shear layer, the improvement of which comprises the use of a shear layer comprising an elastomeric composition having a metal salt of a carboxylic acid, wherein the shear layer comprises:

(a) for 100 phr elastomer;
(b) approximately 10 to 60 phr metal salt of carboxylic acid;
(c) approximately 30 to 70 phr filler; and
(d) approximately 0.5 to 2 phr peroxide.

22. The tire according to claim 1 wherein the shear layer comprises:

(a) for 100 phr natural rubber;
(b) approximately 15–40 phr selected from the group consisting of zinc diacrylate and zinc dimethacrylate;
(c) approximately 30–60 phr filler; and
(d) approximately 0.5 to 2 phr peroxide.

23. The tire according to claim 1 wherein the shear layer comprises:

(a) for 30–65 phr natural rubber;
(b) approximately 35–70 phr polybutadiene;
(c) approximately 10–20 phr selected from the group consisting of zinc diacrylate and zinc dimethacrylate;
(d) approximately 30–60 phr carbon black; and
(e) approximately 0.5 to 2 phr peroxide.

24. The tire according to claim 1 wherein the shear layer comprises:

(a) for 80–100 phr natural rubber;
(b) approximately 0–20 phr polybutadiene;
(c) approximately 20–50 phr selected from the group consisting of zinc diacrylate and zinc dimethacrylate;
(d) approximately 40–70 phr silica; and
(e) approximately 0.5 to 2 phr peroxide.

25. The tire according to claim 1 wherein the shear layer comprises:

(a) for 50–90 phr natural rubber;
(b) approximately 10–50 phr polybutadiene;
(c) approximately 20–40 phr selected from the group consisting of zinc diacrylate and zinc dimethacrylate;
(d) approximately 30–60 phr carbon black; and
(e) approximately 0.5 to 2 phr peroxide.

26. The tire according to claim 1 wherein the shear layer comprises:

(a) for 80–100 phr natural rubber;
(b) approximately 0–20 phr polybutadiene;
(c) approximately 30–50 phr selected from the group consisting of zinc diacrylate and zinc dimethacrylate;
(d) approximately 30–70 phr silica; and
(e) approximately 0.5 to 2 phr peroxide.

* * * * *